United States Patent

Chapman et al.

Patent Number: 6,153,132
Date of Patent: Nov. 28, 2000

[54] CONTROL METHOD FOR THE MANUFACTURE OF ORIENTED PLASTIC TUBES

[75] Inventors: Peter Glanville Chapman, Greenwich; Allan Kenneth Wallace, Tranmere, both of Australia

[73] Assignees: Vinidex Tubemakers Pty. Limited, Australia; Uponor Innovation AB, Sweden

[21] Appl. No.: 09/029,048

[22] PCT Filed: Aug. 16, 1996

[86] PCT No.: PCT/AU96/00514

§ 371 Date: Apr. 29, 1998

§ 102(e) Date: Apr. 29, 1998

[87] PCT Pub. No.: WO97/06940

PCT Pub. Date: Feb. 27, 1997

[30] Foreign Application Priority Data

Aug. 18, 1995 [AU] Australia .............................. PN 4850

[51] Int. Cl.[7] .......................... B29C 47/92; B29C 49/16; B29C 49/78; B29C 55/28

[52] U.S. Cl. ...................... 264/40.3; 264/40.1; 264/40.7; 264/209.4; 264/209.5; 264/564; 264/565; 425/135; 425/140; 425/141; 425/326.1; 425/392; 425/387.1

[58] Field of Search ................................... 264/40.1, 40.3, 264/40.7, 209.4, 209.5, 564, 565; 425/141, 72.1, 326.1, 392, 387.1, 389, 140, 135

[56] References Cited

U.S. PATENT DOCUMENTS

| | | |
|---|---|---|
| 3,400,184 | 9/1968 | Matsuo et al. . |
| 3,577,488 | 5/1971 | Bigland .................................... 264/564 |
| 3,635,633 | 1/1972 | Yazawa et al. ......................... 425/302 |
| 4,140,460 | 2/1979 | Carlsen ................................... 425/140 |
| 4,154,563 | 5/1979 | Johnson ................................. 425/140 |
| 4,189,288 | 2/1980 | Halter .................................... 425/72 R |
| 4,699,580 | 10/1987 | Co ......................................... 425/140 |
| 4,906,429 | 3/1990 | Yamawaki et al. ..................... 264/564 |
| 5,258,148 | 11/1993 | Sensen et al. ......................... 264/40.2 |
| 5,310,329 | 5/1994 | Cree ...................................... 425/72.1 |
| 5,733,487 | 3/1998 | Kirshner ................................ 264/40.1 |

Primary Examiner—Jan H. Silbaugh
Assistant Examiner—Michael I. Poe
Attorney, Agent, or Firm—Hayes, Soloway, Hennessey, Grossman & Hage, P.C.

[57] ABSTRACT

A method of expanding a tube of plastics material in which a longitudinally travelling tube is progressively diametrically expanded in internal fluid pressure in an expansion zone between an upstream plug and an expandable downstream plug. Expansion of the tube is controlled in response to parameters which directly or indirectly indicate variation in the relative velocity at which material is delivered to and removed from the expansion zone, such as detecting upstream velocity, early expansion diameter, axial force on a sizing device or the tube diameter just before the expansion zone.

8 Claims, 2 Drawing Sheets

CONTROL METHOD FOR THE MANUFACTURE OF ORIENTED PLASTIC TUBES

BACKGROUND OF INVENTION

This invention relates to the manufacture of oriented plastics tubes, and in particular to the manufacture of tubes having a high degree of orientation in the circumferential direction.

International Patent Application No. WO 90/02644 describes a process for the manufacture of thermoplastics made, for example, of unplasticised polyvinyl chloride (uPVC) which have a degree of orientation in the circumferential direction that improves properties such as resistance to hoop stresses, and renders the tubes particularly suitable for transmission of water. The process described in that patent application comprises:

(i) extruding a tube of plastics material;
(ii) temperature conditioning the extruded tube to bring it to a consistent temperature profile about the tube suitable for expansion of the tube to cause molecular orientation of the polymer, preferably to a temperature of 85–115° C. for uPVC, more preferably 90–100° C.
(iii) diametrically expanding the tube by application of an internal pressure to the tube that is limited at its downstream end by a plug that is inflatable or otherwise expandable to maintain pressure within the expansion zone; and
(iv) cooling the expanded tube to set the tube in its diametrically expanded configuration.

At the downstream end of the expansion zone, the expanded tube passes through a circular passage in a sizing device which limits diametrical expansion of the tube to that which allows the expanded tube to slide through the sizing device. After the tube has passed through the expansion zone and while it is being cooled, the tube may contract in diameter by a small amount, e.g. a few millimeters or less (so-called "snap-back") as the internal pressure is reduced, to give the tube its final, expanded, diameter.

In the case of tubes that are intended to be used as water pipes, and which must therefore be joined end-to-end, it is necessary for the diameter of the expanded tube, and especially its external diameter, to be controlled in order that the tube will be able to fit accurately and tightly within a coupling device or within an additionally expanded end section of an adjacent tube so as to prevent leakage. We have found, however, that control of the expansion process using conventional feedback control, i.e. by measuring the final expanded diameter and wall thickness of the tube, does not control the properties of the resultant tube sufficiently accurately, nor allow stable operation of the process itself.

SUMMARY OF INVENTION

According to the present invention, there is provided a method of expanding a tube of plastics material in which a longitudinally travelling tube is progressively diametrically expanded by internal fluid pressure in an expansion zone between an upstream plug which fits closely within the bore of the substantially unexpanded tube and a downstream plug which fits closely within the bore of the tube after the expansion step, wherein expansion of the tube is controlled in response to one or more parameters which directly or indirectly indicate variation in the relative velocity at which the material is delivered to and is removed from the expansion zone.

Control of the process in response to changes in the relative velocities is preferably achieved by varying the fluid pressure in the expansion zone. In one preferred form, this is done by controlling leakage of the expansion fluid past the expandable downstream plug, by varying the diameter of the expandable plug. In the most preferred case, in which the downstream plug is inflatable, the leakage is controlled by controlling the pressure of inflation fluid in the plug.

The variation in relative velocity into and out of the expansion zone is preferably measured indirectly, and may be measured by any one or more of the following methods:

(a) The absolute velocity of the unexpanded tube upstream of the expansion zone and the expanded tube downstream may be measured and compared. Preferably the upstream measurement is taken at a point substantially immediately before the expansion zone. This measurement will detect increases in expansion of the tube at the expansion zone as this will be accompanied by an increase in the velocity of material entering the expansion zone as the outward bulging will start to draw material from the upstream side of the upstream plug. In practice, the downstream velocity can be considered to be known with sufficient accuracy from the haul-off rate as no further stretch occurs in the cooled section of tube downstream of the expansion zone. Thus, a reasonable approximation of the relative velocity can be determined by detecting the upstream velocity alone, and variations in the upstream velocity alone may be used as the control parameter as the haul-off rate is dictated by the downstream haul-off tractor and will not generally fluctuate other than due to deliberate change of the haul-off rate.

(b) The diameter of the partly expanded tube may be measured at a position within the expansion zone, preferably at a position less than about three times the pre-expansion tube diameter downstream of the upstream plug. This diameter reflects the precise configuration of the generally frusto-conical expansion region. For example, if the velocity of tube leaving the expansion zone reduces relative to the delivery to the expansion zone, the frusto-conical expansion region of the tube will bulge outwardly to some extent thereby increasing the measured diameter, while if velocity leaving the expansion zone increases relative to the delivery to the expansion zone, the frusto-conical expansion region will become more axially elongated and the measured diameter will decrease.

(c) The force exerted by the expanded tube on the sizing device in the axial direction may be measured. In a first mode of operation the tube expands to fit the sizing device and exerts an axial force on the sizing device in the downstream direction due to its shearing against the internal surface of the sizing device. The magnitude of the axial force will depend on the axial length over which the expanded tube contacts the sizing device and/or on the radial pressure which it applies to the device so that appropriate feedback control can maintain the point at which the tube first contacts the sizing device at the set point. In a second mode of operation, the tube is slightly overexpanded before being drawn down in diameter through the sizing sleeve. The axial force on the sizing sleeve will reflect both the deformation of the overexpanded tube to enter the sizing device and shearing against the inner surface. In either operative mode, the measured force is related to the shape of the expansion zone, and thus to the relative velocities as described above.

(d) The diameter of the unexpanded tube just prior to the expansion zone, for example less than about 10 times the pre-expansion tube diameter upstream of the upstream plug, may be measured. This reading reflects the long term average in velocity entering the expansion zone, as too high an entry velocity over a period of time will cause material to be drawn from the pre-expansion zone, resulting in thinning of the tube material and reduction of diameter upstream of the expansion zone.

BRIEF DESCRIPTION OF THE DRAWINGS

Further preferred embodiments shall now be described with reference to the accompanying drawings, in which.

DESCRIPTION OF THE PREFERRED EMBODIMENTS

Figure 1:
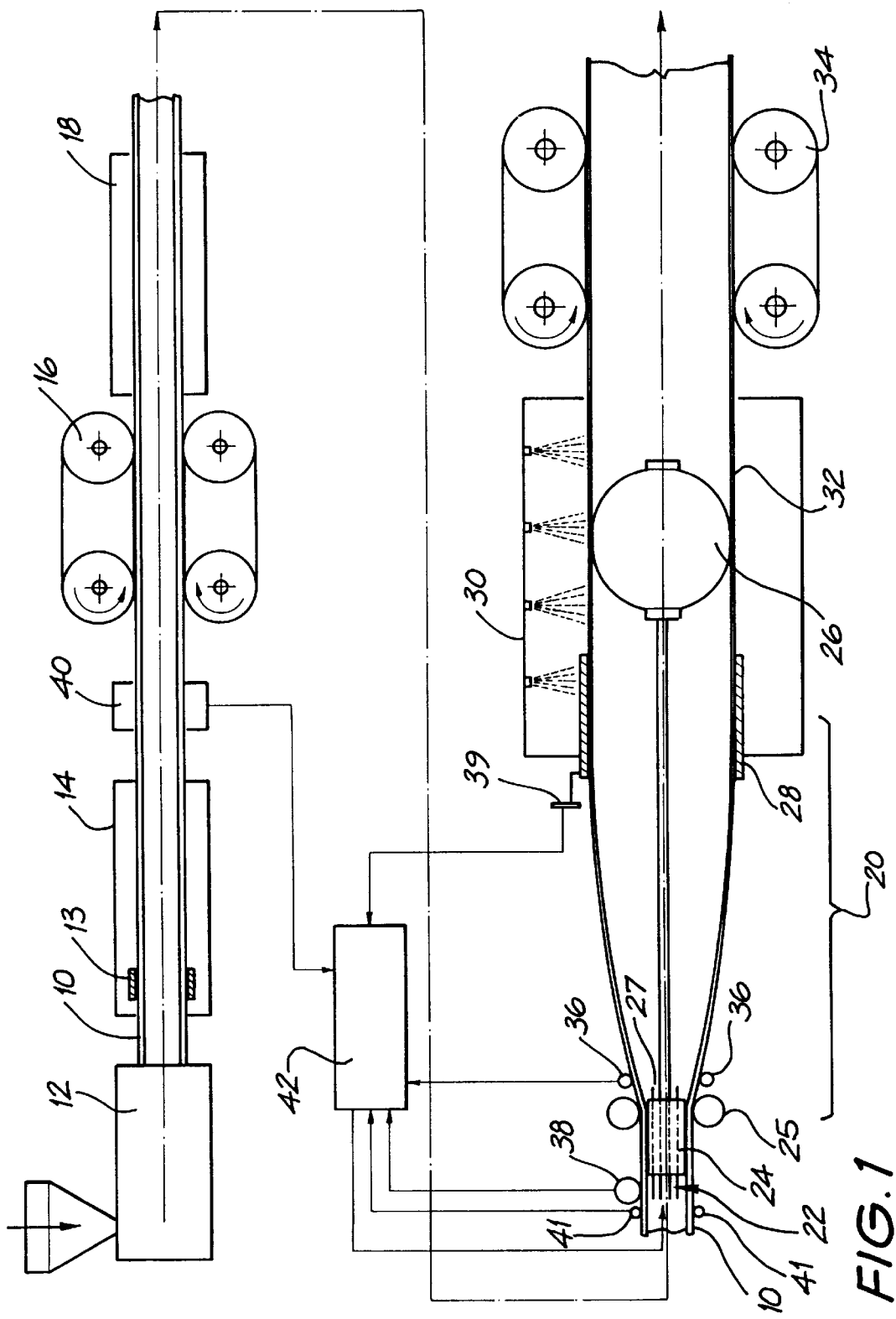
FIG. 1 is a schematic view of the tube manufacture and expansion process.

Referring to FIG. 1, the plastic tube 10 is produced by extruder 12 and is set to correct diameter by a sizing device, such as a sizing sleeve 13, within a primary cooling spray tank 14. The tube 10 is hauled from the extruder by a first haul-off tractor 16.

The tube 10 then proceeds to a temperature conditioning zone 18, in which the tube is treated to attain a specific temperature profile uniformly around the tube wall, so that the subsequent expansion of the tube causes orientation of the polymer molecules principally in the circumferential direction, thus resulting in enhanced physical properties especially increased resistance to hoop stresses. The tube then enters an expansion zone 20 between a pair of plugs 24 and 26 held inside the tube by a service tube 22 connected back through the extruder head to a thrust restraint (not shown).

The first plug 24—the upstream plug relative to the direction of travel of the tube 10—is sized to fit tightly within the unexpanded tube 10. A series of control wheels 25 surrounding the tube circumference push the tube tightly on to the plug 24 so that there is sufficient seal to maintain pressure in the expansion zone. The downstream plug 26 is inflatable so that its diameter can be changed from the unexpanded state to the expanded state in order to start the process.

The plug 26 is preferably as described in our co-pending U.S. patent application Ser. No. 08/666,590 filed Aug. 14, 1996. The plug is inflated sufficiently to maintain pressure in the expansion zone while allowing some of the expansion fluid to flow past the plug and lubricate the plug within the moving tube. The service tube 22 has a pair of concentric tubes, one of which continues forward to carry inflation fluid, for example air, to the downstream plug 26 and the other supplying expansion fluid, preferably hot water, to the upstream plug, which then enters the expansion zone via outlets 27.

Between the two plugs, the plastic tube 10 undergoes expansion in the radial direction due to the internal pressure, without external restraint. Towards the downstream end of the expansion zone, there is provided a sizing sleeve 28 or other sizing device and a cooling spray tank 30 for setting the final diameter of the expanded tube 32. This is followed by a second haul-off tractor 34, which may be set at a higher speed than the first tractor if axial orientation of the tube is desired, and cutting equipment (not shown).

Figure 2A:
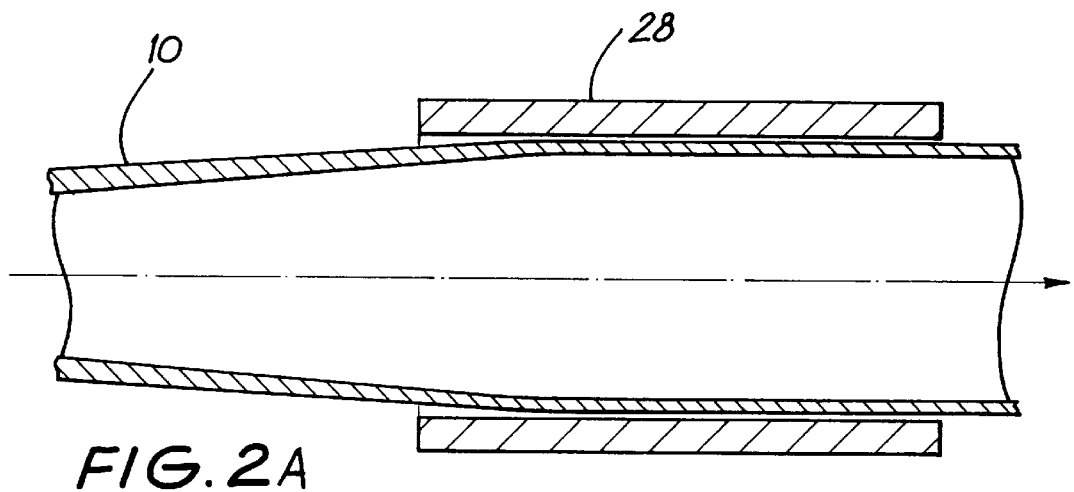
FIGS. 2A and 2B are schematic details of the expanded tube entering the sizing sleeve in first and second operative modes respectively.
Figure 2B:
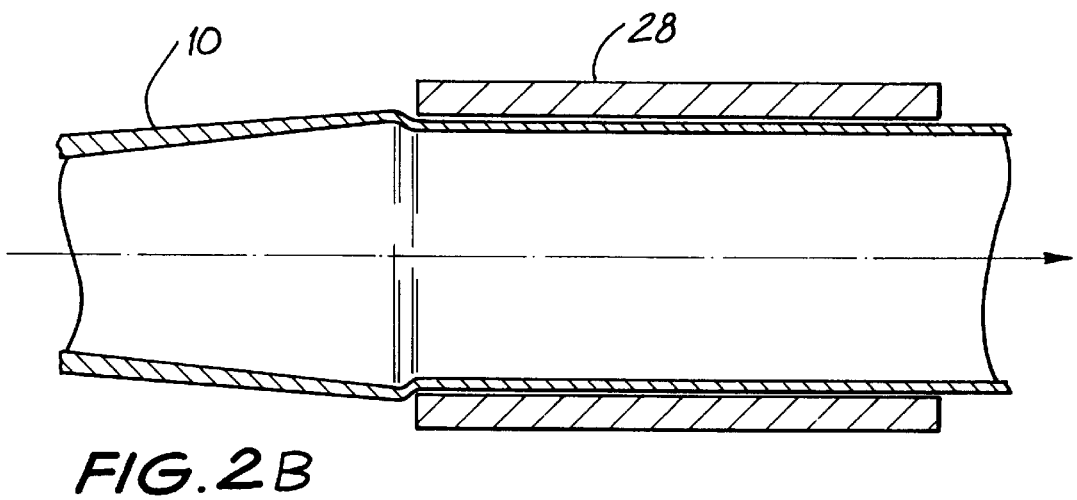

FIGS. 2A and 2B illustrate two modes of operation of the expansion and sizing part of the process. In the first mode, shown in FIG. 2A, the pressure held in the expansion zone behind the inflatable plug is less and the frustroconical shape of the expanding tube more gradual. The tube 10 expands gradually to first contact the sizing sleeve 28 at its entrance or at a point downstream. Adjustment of the pressure in the expansion zone by altering the plug inflation pressure will move the point of first contact between the tube and the sizing sleeve upstream or downstream.

In the second mode, shown in FIG. 2B, the expansion pressure is sufficient to cause inflation of the tube slightly beyond the sizing sleeve diameter. The overexpanded tube is then drawn down to enter the sizing sleeve.

Providing the inflatable plug 26 is inflated sufficiently for the expanding tube to contact the sizing sleeve in either the two modes discussed above, the final outside diameter of the tube will primarily be determined by the sizing sleeve, except for some minor variations due to "snap-back" or some slight degree of creep between the sizing sleeve and the downstream plug. However, this is minimal as the cooling of the expanded tube to fix its diameter has commenced at that point.

Hence, the exact degree of expansion of the inflatable plug has only a slight effect on the final diameter. Instead, the inventors have found that the effect of under- or over-inflation of the plug causes changes in the velocities into and out of the expansion zone. This in turn causes changes in the amount of axial draw occurring in the expansion zone and stability of the process line itself.

The average axial draw of the tube is fixed by ratios of the first and second haul-off tractors. Axial draw is introduced both in the expansion zone itself and in the pre-expansion zone between the first haul-off 16 and the upstream plug. Essentially no axial draw is introduced after the expansion zone as the tube has been cooled. Thus, at any time, the sum of the axial draw being introduced in the expansion and pre-expansion zones will be equal to the haul-off ratio and therefore constant. The inventors have found that it is important both to product consistency and the operation of the process itself to control how much of this occurs in each zone.

A number of devices for measuring various parameters of the tube 10 before or during expansion are provided for indicating the rate at which the tube material enters and leaves the expansion zone 20.

Means 36 for measuring the diameter of the tube may be provided in the expansion zone, preferably located less than three tube diameters, more preferably less than one diameter, downstream from the upstream plug. The diameter of the tube at this early stage of expansion gives a surprisingly accurate correlation to the shape of the expansion zone and thus the relative velocities, yet provides the information soon enough for adequate control.

Over-expansion of the tube may start to draw material from the upstream side of the upstream plug and hence velocity measurement means 38 located just upstream can provide information for process control. In addition, even slight discrepancies in the long term average of the relative velocity away from the set point can cause variation in the pre-expansion diameter which is measured by device 41.

The forward thrust generated by the tube on the sizing device 28 may be measured by means 39 and used for process control, as this measurement is very sensitive to variations in the shape of the expansion zone.

In addition to the above, the inventors have found that an important factor determining the expansion behavior is the wall thickness of the extruded tube 10, and that this measurement generated by wall thickness measuring apparatus 40 located before the expansion zone, is useful for feed-forward control of the process.

An increase in wall thickness entering the expansion zone will cause narrowing of the cone as it is stronger and so resists the expansion pressure. This in turn drags less upstream material into the expansion zone, reducing the upstream velocity and thus is partly self-correcting in terms of mass flow. However, the inventors have found that this changes the balance of the whole production line. The control system according to the invention detects this change in velocity into the expansion zone (either directly or indirectly) and increases the expansion pressure. This reverses the dip in upstream velocity, even though this increases the mass flow further.

The axial draw over the whole line is determined by the ratio of the two haul-offs and thus is constant. The invention controls how much of this occurs in the expansion zone and how much upstream. Virtually none occurs after the expanding tube leaves the sizing sleeve 28 as the tube has been fixed by cooling.

In practice, the signals from the measuring devices 36, 38, 39, 40 and 41 will be fed to a processor 42. If the signals indicate that the relativity between the velocities into and out of the expansion zone has deviated from the set point for the process, the processor will in turn control the inflation fluid supplied to the inflatable plug 26 through the service tube 22. Thus, for example, if early diameter detector 36 signals too high a reading or if the velocity measurement from 38 is more than a predetermined amount greater than the speed of the first tractor 16, pressure will be released from the inflatable plug. This in turn will reduce the pressure of expansion fluid retained behind the plug 26, by allowing excess expansion fluid to escape past the inflatable plug.

The inventors have discovered that the relationship between the inflation pressure of the plug and pressure drop across the plug is predictable according to the following equation:

$$P_p = \Delta P + P_d$$

where $P_p$=Pressure applied to plug $\Delta P$=Pressure differential across plug $P_d$=Pressure to expand plug to diameter d without confinement (free expansion pressure)

While control of the expansion by varying the plug pressure has been found by the inventors to be very convenient and is preferred, it will be appreciated that other control responses may be employed in addition or as alternatives. For example, the relative velocities into and out of the expansion zone can be controlled more directly by varying the haul-off rate at tractor 34.

The detected properties are preferably used in combination for control of the process. For example, the thrust on the sizing sleeve and the wall thickness of the unexpanded tube may be used for coarse adjustment while fine adjustments may be made in response to variations in the linear velocity reading from 38 and the early expansion diameter measurement from 36. A preferred method of combining use of the control parameters is to use variations in the sizing sleeve thrust measurement to vary the control set point for the early expansion diameter.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A method of expanding a tube of plastic material, in which a longitudinally travelling tube is progressively diametrically expanded by internal fluid pressure in an expansion zone between an upstream plug which fits closely within the bore of the substantially unexpanded tube and a downstream expandable plug which fits closely within the bore of the tube after diametrical expansion, the tube passing through a sizing device located between the upstream plug and the downstream plug for controlling the final outside diameter of said tube, wherein diametrical expansion of the tube is controlled by varying internal fluid pressure in said expansion zone to control variations in the relative velocity at which the material is delivered to and is removed from said expansion zone in response to one or more parameters which directly or indirectly indicate the variations in the relative velocity at which the material is delivered to and is removed from the expansion zone, one of said parameters being measured upstream of said expansion zone to thereby provide at least feed-forward control of diametrical expansion.

2. A method according to claim 1 wherein said parameter comprises a comparison of tube velocity upstream and downstream of the expansion zone.

3. A method according to claim 1 wherein said parameter comprises velocity of the unexpanded tube entering the expansion zone.

4. A method according to claim 1 wherein said parameter is axial force applied by the expanding tube on the sizing device.

5. A method according to claim 1 wherein said parameter comprises the diameter of the tube when partly expanded at a point in the expansion zone at a linear distance less than three pre-expansion tube diameters downstream of the upstream plug.

6. A method according to claim 5 wherein said point is at a linear distance less than one pre-expansion tube diameter downstream from the upstream plug.

7. A method according to claim 1, wherein said expansion is controlled by controlling leakage of fluid from the expansion zone past the downstream plug.

8. A method according to claim 7 wherein said downstream plug is inflatable by internal fluid pressure of an inflation fluid within the downstream plug, and said leakage is controlled by varying the pressure of said inflation fluid.

* * * * *